(12) United States Patent
Su et al.

(10) Patent No.: US 10,215,558 B2
(45) Date of Patent: Feb. 26, 2019

(54) ROTATION ANGLE MEASURING SYSTEM AND MACHINING SYSTEM COMPRISING THE SAME

(71) Applicant: NOPORVIS CO., LTD., Kaohsiung (TW)

(72) Inventors: Wei-Hung Su, Kaohsiung (TW); Hui-Hung Lin, Tainan (TW); Kuo-Kai Hung, Tainan (TW); Chun-Neng Chan, Kaohsiung (TW); Lu-Yu Wang, Tainan (TW)

(73) Assignee: NOPORVIS CO., LTD., Kaohsiung (TW)

( * ) Notice: Subject to any disclaimer, the term of this patent is extended or adjusted under 35 U.S.C. 154(b) by 166 days.

(21) Appl. No.: 15/393,270

(22) Filed: Dec. 29, 2016

(65) Prior Publication Data

US 2018/0143010 A1 May 24, 2018

(30) Foreign Application Priority Data

Nov. 22, 2016 (TW) .............................. 105138312 A

(51) Int. Cl.
*G01B 11/26* (2006.01)
*G01B 9/02* (2006.01)
*B23Q 17/24* (2006.01)

(52) U.S. Cl.
CPC ........... *G01B 11/26* (2013.01); *B23Q 17/2428* (2013.01); *G01B 9/02019* (2013.01); *G01B 9/02027* (2013.01); *G01B 2290/70* (2013.01)

(58) Field of Classification Search
CPC ................ G01B 9/02019; G01B 11/26; G01B 9/02025; B23Q 17/2428
See application file for complete search history.

(56) References Cited

U.S. PATENT DOCUMENTS

| | | | | |
|---|---|---|---|---|
| 4,889,425 A | * | 12/1989 | Edwards | G01B 11/16 356/141.3 |
| 5,056,921 A | * | 10/1991 | Chaney | G01B 11/26 356/493 |
| 5,418,611 A | * | 5/1995 | Huang | G01B 11/26 356/141.2 |
| 2003/0218757 A1 | * | 11/2003 | Hill | G01B 11/26 356/500 |

* cited by examiner

*Primary Examiner* — Maurice Smith
(74) *Attorney, Agent, or Firm* — Winston Hsu

(57) ABSTRACT

A rotation angle measuring device includes a light source for generating a first light beam with a first polarization direction and a second light beam with a second polarization direction; a first beam splitter for splitting the first light beam and the second light beam to generate a third light beam and a fourth light beam; an image sensor for sensing a first interference pattern generated by the first and second light beams passing through a first displacement measurement module, and sensing a second interference pattern generated by the third and fourth light beams passing through a second displacement measurement module; and a processing unit for calculating two displacement values at two different positions on a measured object according to the first and second interference patterns, in order to further calculate a rotation angle of the rotation angle measuring device relative to the measured object along a first axis.

15 Claims, 9 Drawing Sheets

ROTATION ANGLE MEASURING SYSTEM AND MACHINING SYSTEM COMPRISING THE SAME

BACKGROUND OF THE INVENTION

1. Field of the Invention

The present invention relates to a rotation angle measuring system and a machining system, and more particularly, to a rotation angle measuring system and a machining system capable of improving machining precision.

2. Description of the Prior Art

As related technology keeps improving, requirements on machining quality and machining precision of a workpiece are getting higher. Generally, a machine tool utilizes a ball screw or other precision transmission mechanism to move a cutting tool or a workpiece for machining the workpiece precisely. However, resolution of the ball screw is at the micron level. The current machine tool can only perform micron level machining on the workpiece by controlling rotation of the ball screw. When the machine tool is required to perform sub-micron level or nano level machining on the workpiece, the machine tool needs to cooperate with a displacement measuring device with higher resolution to perform machining. However, the current high resolution displacement measuring device usually has a more complex structure and a larger size, and does not have a function of measuring rotation angle, such that the high resolution displacement measuring device of the prior art cannot be effectively integrated with the machine tool for higher dimensional machining.

SUMMARY OF THE INVENTION

The present invention provides a rotation angle measuring device comprising a light source, a first beam splitter, a first displacement measuring module, a second displacement measuring module, an image sensor and a processing unit. The light source is configured to generate a first light beam with a first polarization direction and a second light beam with a second polarization direction. The first beam splitter is configured to split the first and second light beam to generate a third light beam with the first polarization direction and a fourth light beam with the second polarization direction. The first displacement measuring module is configured to allow the first and second light beams to pass through a first side of the first displacement measuring module and to be further reflected to pass through a second side of the first displacement measuring module, wherein the first light beam is reflected by a first measuring surface of a measured object, and the second light beam is reflected inside the first displacement measuring module. The second displacement measuring module is configured to allow the third and fourth light beams to pass through a first side of the second displacement measuring module and to be further reflected to pass through a second side of the second displacement measuring module, wherein the third light beam is reflected by the first measuring surface of the measured object, and the fourth light beam is reflected inside the second displacement measuring module. The image sensor is configured to sense a first interference pattern generated by the first and second light beams passing through the first displacement measurement module, and sense a second interference pattern generated by the third and fourth light beams passing through the second displacement measurement module. The processing unit is electrically connected to the image sensor for calculating a first displacement value of the first displacement measuring module relative to a first position on the first measuring surface of the measured object along a first axis according to the first interference pattern, and calculating a second displacement value of the second displacement measuring module relative to a second position on the first measuring surface of the measured object along the first axis according to the second interference pattern, in order to further calculate a rotation angle of the rotation angle measuring device relative to the measured object around a second axis according to the first and second displacement values.

The present invention further provides a machining system comprising a base, a cutting tool, at least one supporting frame, a holding platform and a rotation angle measuring device. The cutting tool is arranged on the base for machining a workpiece. The at least one supporting frame is arranged on the base. The holding platform is arranged on the at least one supporting frame for holding the workpiece, and the holding platform is movable or rotatable relative to the base through the at least one supporting frame. The rotation angle measuring device comprises a light source, a first beam splitter, a first displacement measuring module, a second displacement measuring module, an image sensor and a processing unit. The light source is configured to generate a first light beam with a first polarization direction and a second light beam with a second polarization direction. The first beam splitter is configured to split the first and second light beam for generating a third light beam with the first polarization direction and a fourth light beam with the second polarization direction. The first displacement measuring module is configured to allow the first and second light beams to pass through a first side of the first displacement measuring module and to be further reflected to pass through a second side of the first displacement measuring module, wherein the first light beam is reflected by a first measuring surface of the base, and the second light beam is reflected inside the first displacement measuring module. The second displacement measuring module is configured to allow the third and fourth light beams to pass through a first side of the second displacement measuring module and to be further reflected to pass through a second side of the second displacement measuring module, wherein the third light beam is reflected by the first measuring surface of the base, and the fourth light beam is reflected inside the second displacement measuring module. The image sensor is configured to sense a first interference pattern generated by the first and second light beams passing through the first displacement measurement module, and sense a second interference pattern generated by the third and fourth light beams passing through the second displacement measurement module. The processing unit is electrically connected to the image sensor for calculating a first displacement value of the first displacement measuring module relative to a first position on the first measuring surface of the base along a first axis according to the first interference pattern, and calculating a second displacement value of the second displacement measuring module relative to a second position on the first measuring surface of the base along the first axis according to the second interference pattern, in order to further calculate a rotation angle of the rotation angle measuring device relative to the base around a second axis according to the first and second displacement values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
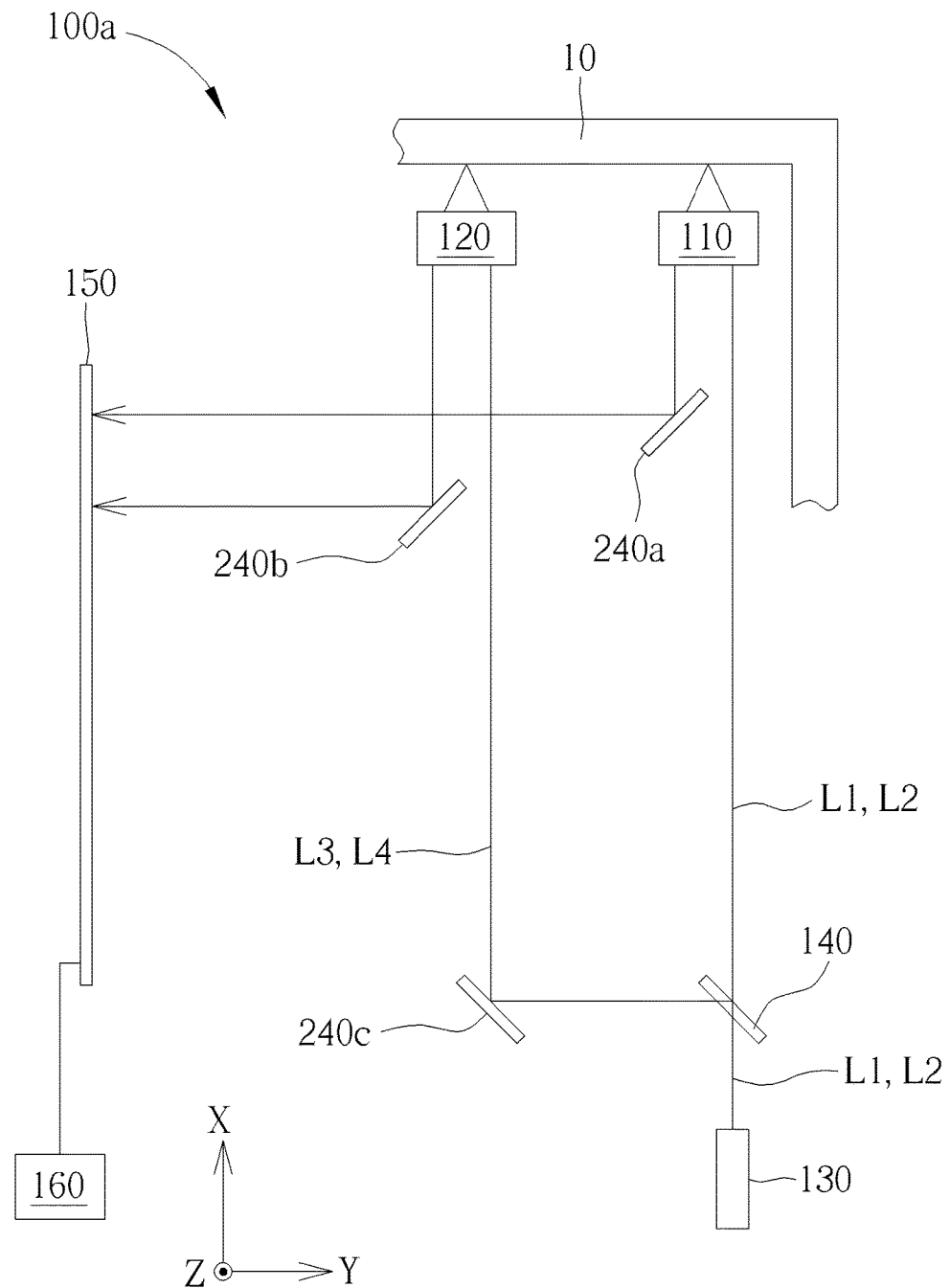
FIG. 1 is a diagram showing a first embodiment of a rotation angle measuring device of the present invention.

Please refer to FIG. 1. FIG. 1 is a diagram showing a first embodiment of a rotation angle measuring device of the present invention. As shown in FIG. 1, the rotation angle measuring device 100a of the present invention comprises a light source 130, a first beam splitter 140, a first displacement measuring module 110, a second displacement measuring module 120, an image sensor 150 and a processing unit 160. The light source 130 is configured to generate a first light beam L1 with a first polarization direction and a second light beam L2 with a second polarization direction. The first beam splitter 140 is configured to split the first light beam L1 and the second light beam L2 to generate a third light beam L3 with the first polarization direction and a fourth light beam L4 with the second polarization direction. After the first light beam L1 and the second light beam L2 pass through a first side of the first displacement measuring module 110, the first light beam L1 is reflected by a measured object 10, and the second light beam L2 is reflected inside the first displacement measuring module 110. Thereafter, the first light beam L1 and the second light beam L2 pass through a second side of the first displacement measuring module 110 and are reflected to the image sensor 150 by a reflective element 240a. The image sensor 150 is configured to sense a first interference pattern generated by the first light beam L1 and the second light beam L2. The processing unit 160 is configured to calculate a distance between the first displacement measuring module 110 and a first position on the measured object 10 according to the first interference pattern. The processing unit 160 is further configured to calculate a first displacement value of the first displacement measuring module 110 relative to the first position on the measured object 10 along X axis according to variation of the distance between the first displacement measuring module 110 and the first position on the measured object 10. Similarly, after the third light beam L3 and the fourth light beam L4 pass through a first side of the second displacement measuring module 120, the third light beam L3 is reflected by a measured object 10, and the fourth light beam L4 is reflected inside the second displacement measuring module 120. Thereafter, the third light beam L3 and the fourth light beam L4 pass through a second side of the second displacement measuring module 120 and are reflected to the image sensor 150 by a reflective element 240b. The image sensor 150 is further configured to sense a second interference pattern generated by the third light beam L3 and the fourth light beam L4. The processing unit 160 is further configured to calculate a distance between the second displacement measuring module 120 and a second position on the measured object 10 according to the second interference pattern. The processing unit 160 is further configured to calculate a second displacement value of the second displacement measuring module 120 relative to the second position on the measured object 10 along X axis according to variation of the distance between the second displacement measuring module 120 and the second position on the measured object 10. After obtaining the first and second displacement values, the processing unit 160 is further configured to calculate a rotation angle of the rotation angle measuring device 100a relative to the measured object 10 around Z axis. For example, when the first displacement measuring module 110 is moved toward the first position on the measured object 10 and the second displacement measuring module 120 is moved away from the second position on the measured object 10, the processing unit 160 determines that the rotation angle measuring device 100a is rotated relative to the measured object 10 around Z axis counterclockwise, and further calculates the rotation angle of the rotation angle measuring device 100a around Z axis according to the first and second displacement values.

Figure 2:
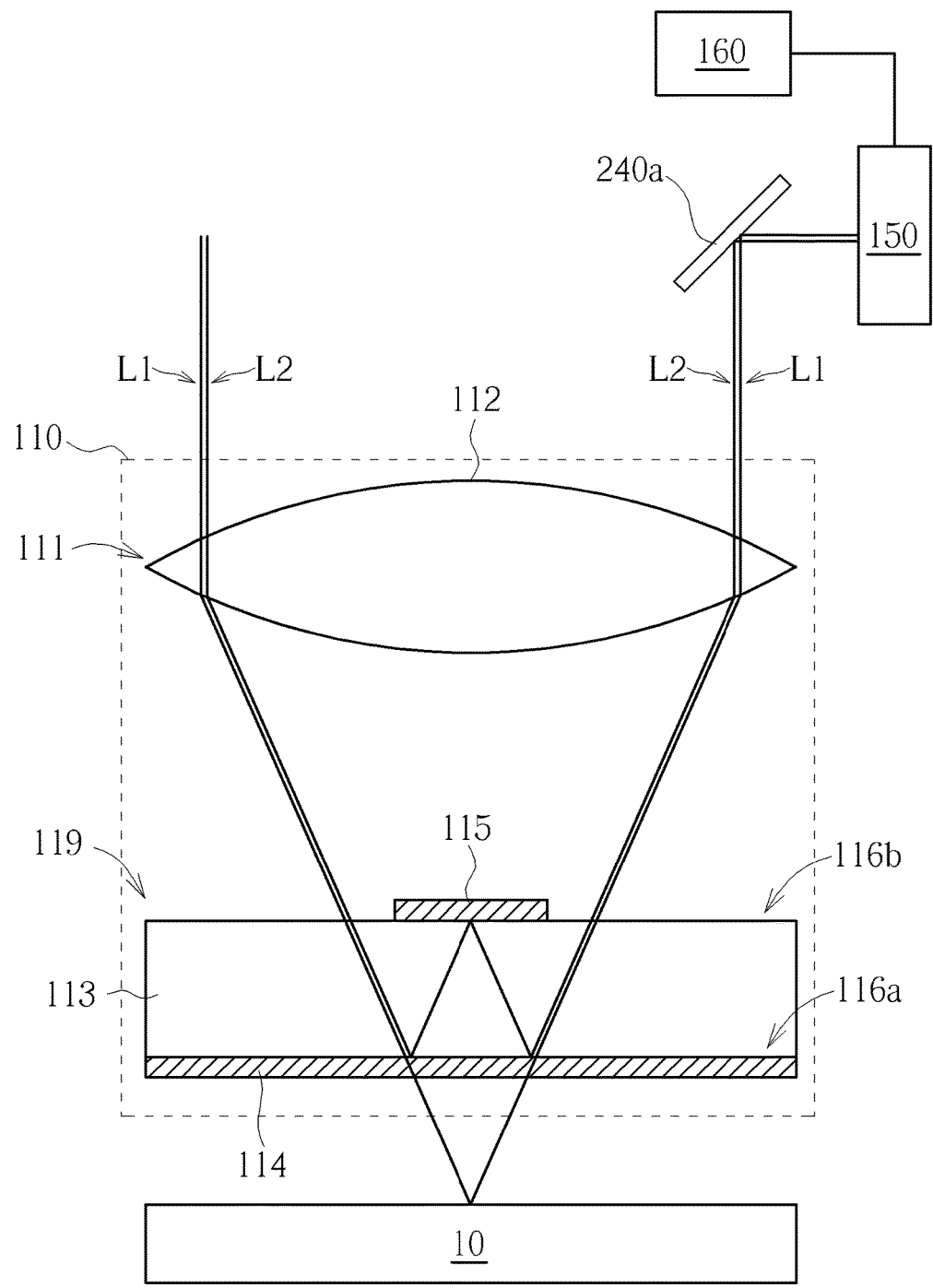
FIG. 2 is a diagram showing a first displacement measuring module of the present invention.

Please refer to FIG. 2, and refer to FIG. 1 as well. FIG. 2 is a diagram showing the first displacement measuring module of the present invention. As shown in FIG. 2, the first displacement measuring module 110 of the present invention comprises an optical module 111 and a beam splitting module 119. The optical module 111 comprises a lens 112 for refracting light. The beam splitting module 119 comprises a transparent plate 113, a polarizing beam splitting layer 114 and a reflective layer 115. The transparent plate 113 has a first surface 116a and a second surface 116b. The second surface 116b is opposite to the first surface 116a. The first surface 116a is configured to be arranged between the second surface 116b and the measured object 10. The polarizing beam splitting layer 114 is formed on the first surface 116a for allowing light with the first polarization direction to pass through and reflecting light with the second polarization direction. The reflective layer 115 is partially formed on the second surface 116b for reflecting light. The reflective layer 115 can function similarly to the polarizing beam splitting layer 114 to allow the light with the first polarization direction to pass through and reflect the light with the second polarization direction, or the reflective layer 115 can reflect all visible light. The first light beam L1 and the second light beam L2 have identical phase and wavelength. The first light beam L1 and the second light beam L2 can be laser light, white light or other visible light. The first light beam L1 is refracted to enter the transparent plate 113 after passing through a first side of the lens 112. When the first light beam L1 reaches the polarizing beam splitting layer 114, the polarizing beam splitting layer 114 allows the first light beam L1 with the first polarization direction to pass through. Thereafter, the first light beam L1 is reflected by a surface of the measured object 10 in order to further sequentially pass through the polarizing beam splitting layer 114, the transparent plate 113 and a second side of the lens 112. On the other hand, the second light beam L2 is refracted to enter the transparent plate 113 after passing through the first side of the lens 112. When the second light beam L2 reaches the polarizing beam splitting layer 114, the polarizing beam splitting layer 114 reflects the second light beam L2 with the second polarization direction. Thereafter, the second light beam L2 is sequentially reflected by the reflective layer 115 and the polarizing beam splitting layer 114 in the transparent plate 113, so as to further pass through the second side of the lens 112.

Figure 3:
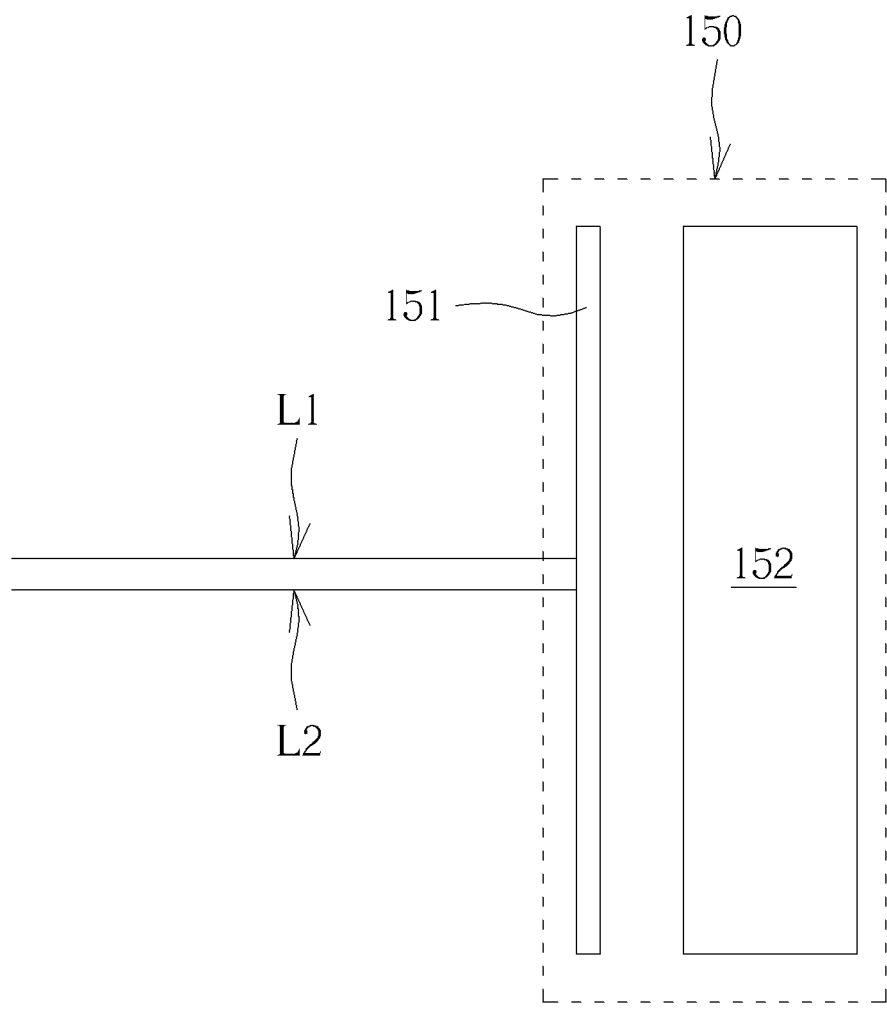
FIG. 3 is a diagram showing an image sensor of the present invention.

After the first light beam L1 and the second light beam L2 pass through the second side of the lens 112, the reflective element 240a reflects the first light beam L1 and the second light beam L2 passing through the second side of the lens 112 to the image sensor 150. After receiving the first light beam L1 and the second light beam L2, the image sensor 150 is configured to sense the first interference pattern generated by the first light beam L1 and the second light beam L2. As shown in FIG. 3, the image sensor 150 of the present invention can comprises a linear polarizing plate 151 and an image sensing unit 152 (such as a CCD or CMOS sensing unit). The first light beam L1 and the second light beam L2 are projected onto the linear polarizing plate 151 after passing through the second side of the lens 112, in order to generate the first interference pattern on the linear polarizing plate 151. The sensing unit 152 is then configured to sense the first interference pattern generated on the linear polarizing plate 151. The processing unit 160 is electrically connected to the image sensor 150 and configured to calculate the first displacement value of the first displacement measuring module 110 relative to the first position on the measured object 10 along X axis according to the first interference pattern sensed by the image sensor 150. For example, when a travelling distance of the first light beam L1 is equal to that of the second light beam L2, a brighter interference pattern is generated by the first light beam L1 and the second light beam L2 due to the identical phases of the first light beam L1 and the second light beam L2. When the travelling distance of the first light beam L1 differs from that of the second light beam L2 by a half of wavelength, a darker interference pattern is generated by the first light beam L1 and the second light beam L2 due to opposite phases of the first light beam L1 and the second light beam L2. Therefore, the processing unit 160 can determine a light travelling distance difference between the first light beam L1 and the second light beam L2 according to brightness of the first interference pattern. Since the travelling distance of the second light beam L2 is fixed, the processing unit 160 can calculate the travelling distance of the first light beam L1 according to the travelling distance of the second light beam L2 and the light travelling distance difference between the first light beam L1 and the second light beam L2. Thereafter, the processing unit 160 can further calculate a distance between the first position on the measured object 10 and the first surface 116a according to the travelling distance of the first light beam L1. In other words, when the first displacement measuring module 110 is moved relative to the measured object 10, the processing unit 160 can calculate the first displacement value of the first displacement measuring module 110 relative to the first position on the measured object 10 along X axis according to variations in brightness of the first interference pattern. Component arrangement and measuring method of the second displacement measuring module 120 are identical to those of the first displacement measuring module 110. Therefore, no further illustration is provided.

According to the above arrangement, since the wavelength of light is several hundreds of nanometers, resolution of the displacement values of the rotation angle measuring device 100a of the present invention can achieve a sub-micron level or a nano level, such that the rotation angle measuring device 100a of the present invention is capable of measuring a tiny rotation angle. In addition, the rotation angle measuring device 100a of the present invention only needs to utilize the first beam splitter 140, the first displacement measuring module 110 and the second displacement measuring module 120 to generate the first and second interference patterns according to the first light beam L1, the second light beam L2, the third light beam L3 and the fourth light beam L4. Therefore, the rotation angle measuring device 100a of the present invention can have a simpler structure and a smaller size. Furthermore, in the rotation angle measuring device 100a of the present invention, the light beams L1, L2, L3 and L4 are required to pass through fewer optical components, and the first beam splitter 140 splits the light beams L1, L2, L3 and L4 according to the polarization directions. Therefore, the rotation angle measuring device 100a of the present invention has less beam energy loss, such that the rotation angle measuring device 100a can obtain a more precise measuring result.

In addition, the optical module 111 can comprises two smaller lenses arranged at the first side and the second side of the optical module 111 respectively for replacing the larger lens 112. Therefore, the size of the rotation angle measuring device 100a of the present invention can be further reduced. On the other hand, the optical module 111 can also comprise two prisms or two reflectors instead of the two smaller lenses, in order to reflect or refract light to the beam splitting module 119.

Figure 4:
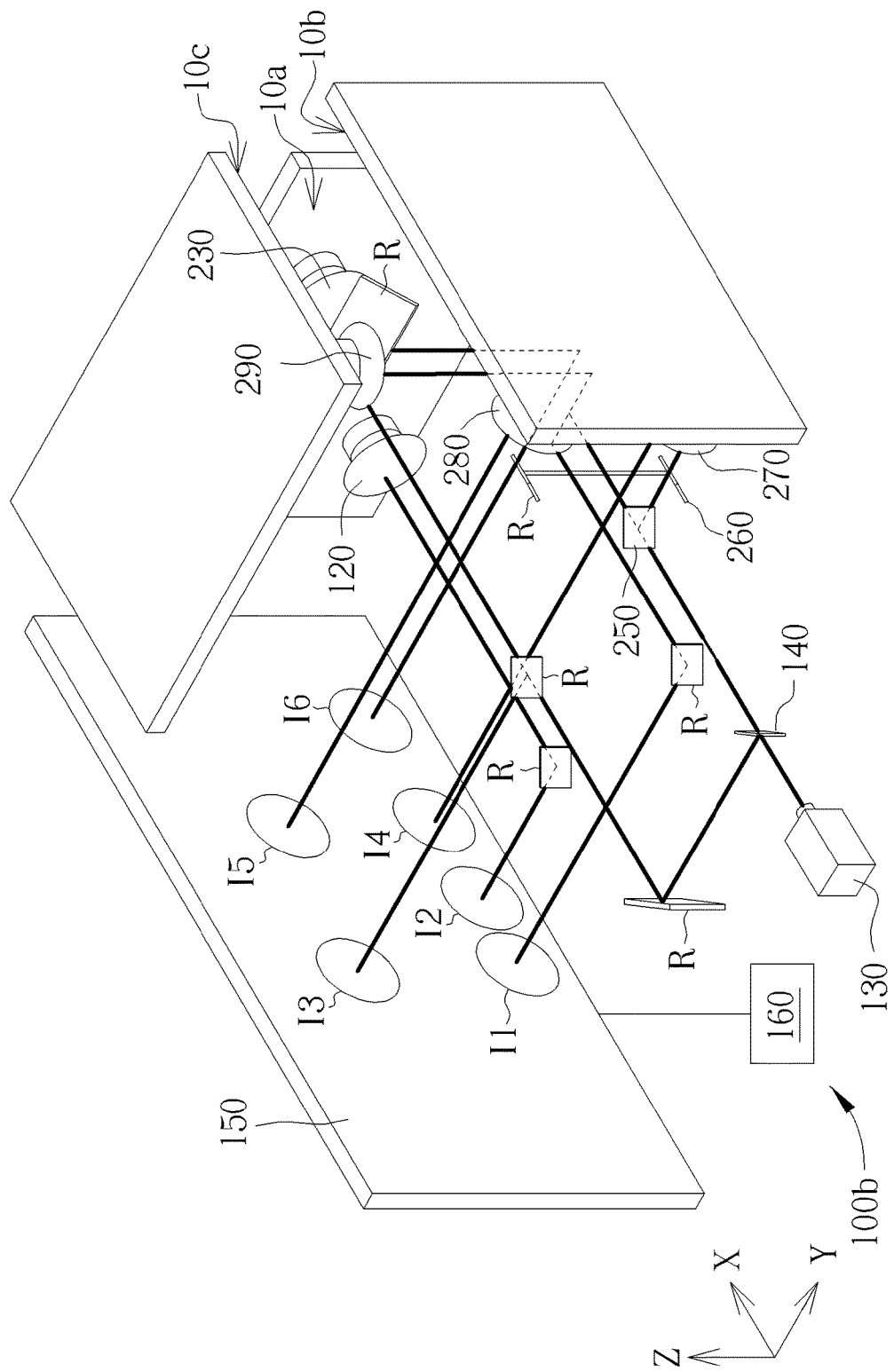
FIG. 4 is a diagram showing a second embodiment of the rotation angle measuring device of the present invention.
Figure 5:
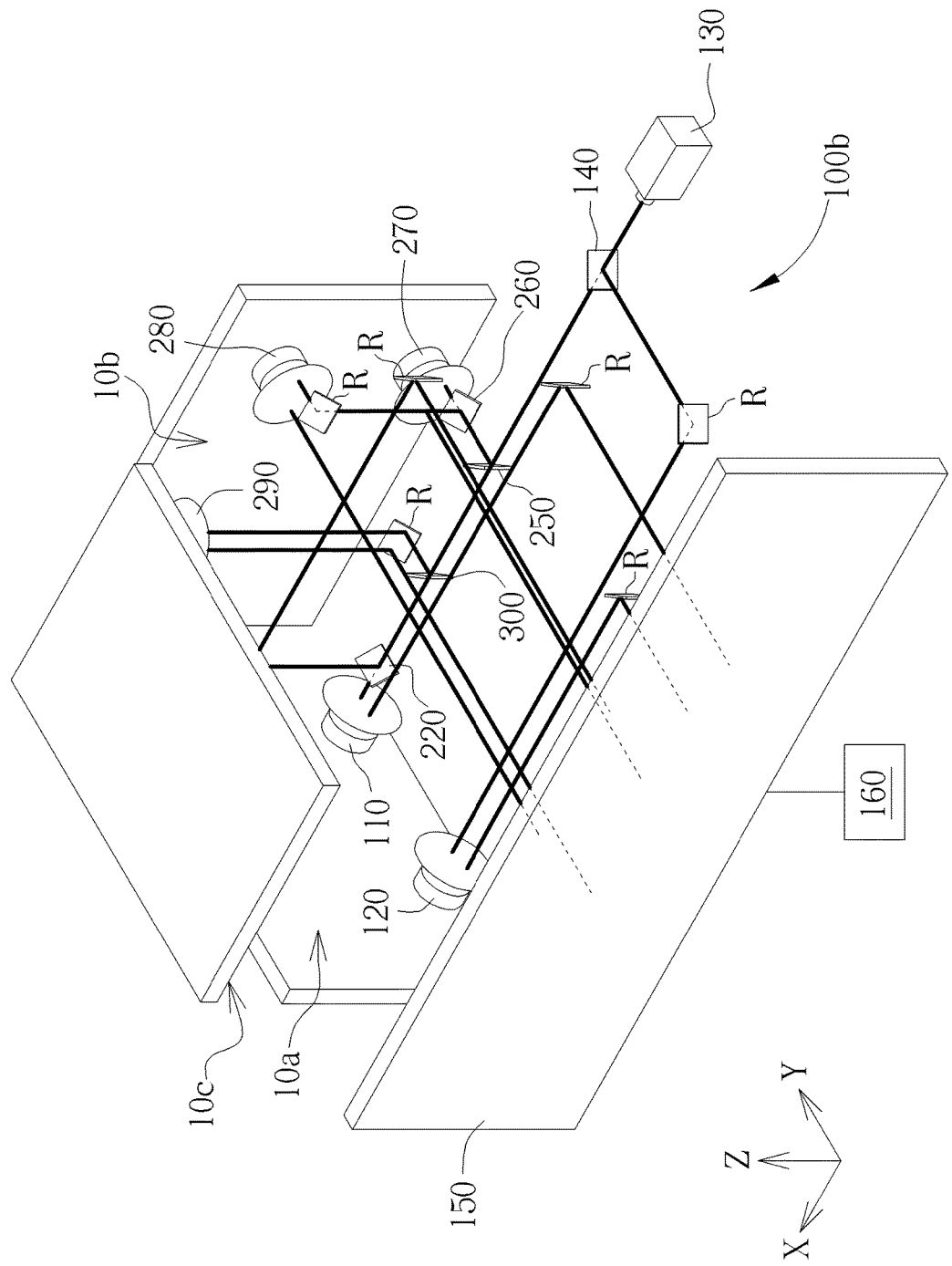
FIG. 5 is diagram showing the second embodiment of the rotation angle measuring device of the present invention in another angle.

Please refer to FIG. 4 and FIG. 5. FIG. 4 and FIG. 5 are diagrams showing a second embodiment of the rotation angle measuring device of the present invention. In the present embodiment, a plurality of beam splitters and displacement measuring modules are added for measuring other rotation angles of the rotation angle measuring device relative to the measured object 10 around different axes. As show in FIG. 4 and FIG. 5, the rotation angle measuring device 100b of the present invention comprises a light source 130, first to fifth beam splitters 140, 220, 250, 260, 300, first to sixth displacement measuring modules 110, 120, 230, 270, 280, 290, an image sensor 150, a processing unit 160 and a plurality of reflective elements R. According to the above illustration, after the light source 130 generates the first light beam L1 and the second light beam L2, the first light beam L1 and the second light beam L2 are split by the beam splitters to pass through the displacement measuring modules, in order to be further guided to the image sensor 150. For ease of illustration, three measuring surface 10a, 10b, 10c of the measured object 10 in FIG. 4 and FIG. 5 are not connected, but the three measuring surfaces 10a, 10b, 10c are on the same measured object 10. Wherein, the first displacement measuring module 110, the second displacement measuring module 120 and the third displacement measuring module 230 are configured to measure the first measuring surface 10a of the measured object 10. The fourth displacement measuring module 270 and the fifth displacement measuring module 280 are configured to measure the second measuring surface 10b of the measured object 10. The sixth displacement measuring module 290 is configured to measure the third surface 10c of the measured object 10. After the light beams pass through the corresponding displacement measuring modules, the light beams are guided to the image sensor 150 for generating the interference patterns. The processing unit 160 calculates the displacement values of the displacement measuring modules relative to different positions on the measured object 10 according to the interference patterns, and further calculates the rotation angle of the rotation angle measuring device 100b relative to the measured object 10 around different axes. Component arrangements and measuring methods of the third displacement measuring module 230, the fourth displacement measuring module 270, the fifth displacement measuring module 280 and the sixth displacement measuring module 290 are similar to those of the first displacement measuring module 110. Therefore, no further illustration is provided.

Figure 6:
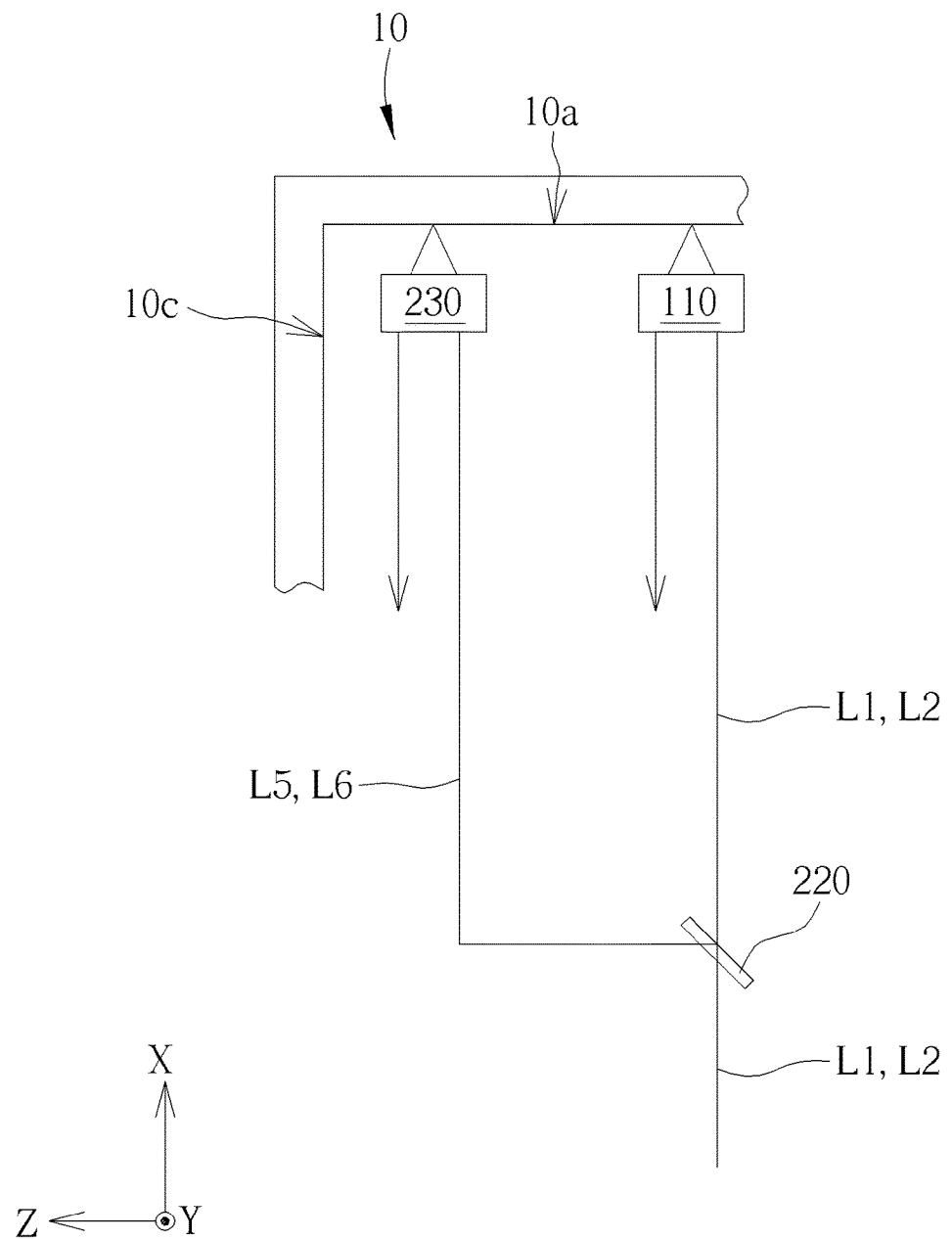
FIG. 6 is a partial view of the second embodiment of the rotation angle measuring device of the present invention.
Figure 7:
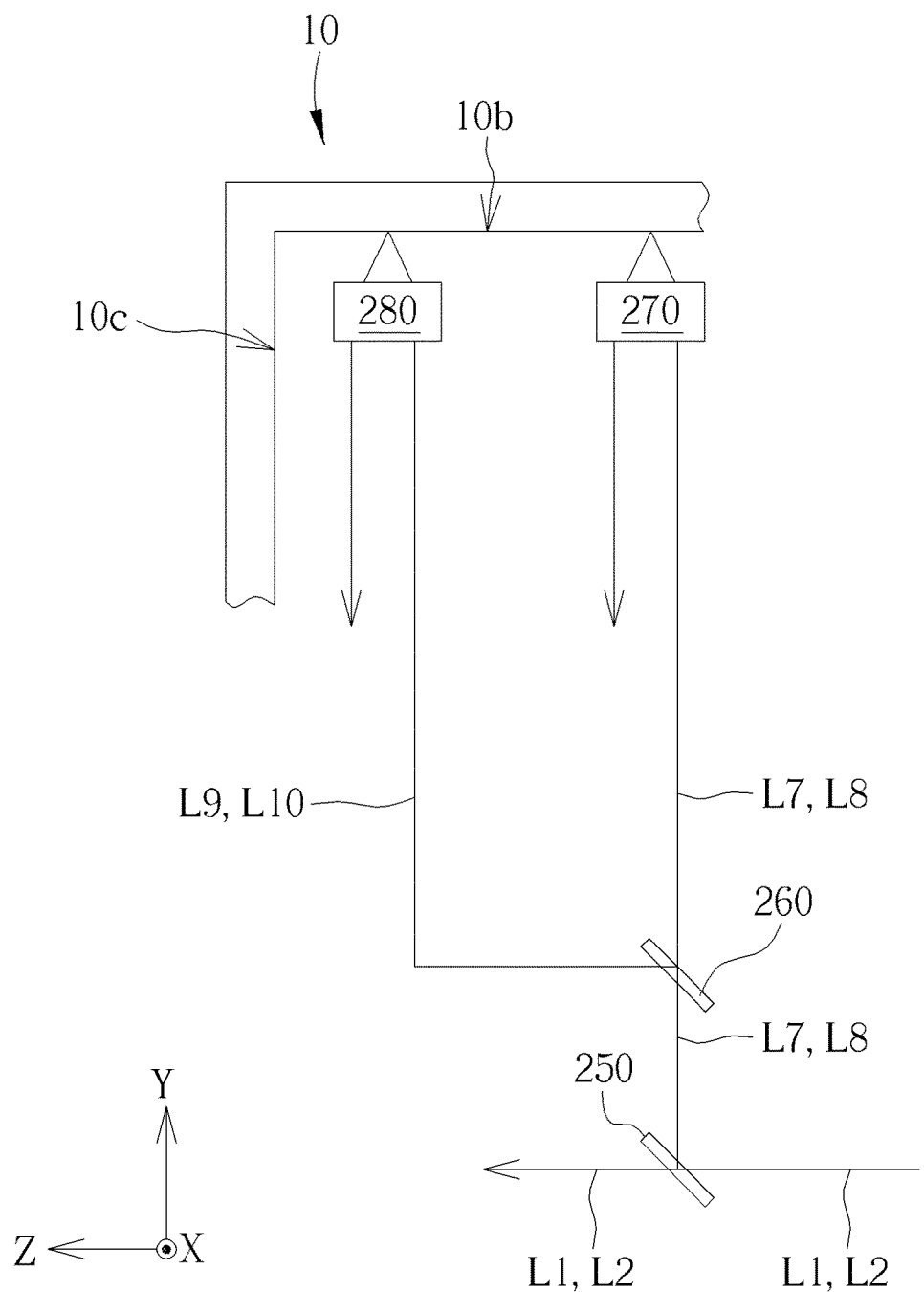
FIG. 7 is an another partial view of the second embodiment of the rotation angle measuring device of the present invention.

Please refer to FIG. 6 and FIG. 7, and refer to FIG. 4 and FIG. 5 as well. FIG. 6 and FIG. 7 are partial views of the second embodiment of the rotation angle measuring device of the present invention. As shown in FIG. 6, the second beam splitter 220 splits the first light beam L1 and the second light beam L2 in order to generate a fifth light beam L5 with the first polarization direction and a sixth light beam L6 with the second polarization direction. The third displacement measuring module 230 is arranged above the first displacement measuring module 110 for measuring the first measuring surface 10a of the measured object 10. The fifth light beam L5 and the sixth light beam L6 are reflected to the image sensor 150 after passing through the third displacement measuring module 230. The image sensor 150 is further configured to sense a third interference pattern I3 generated by the fifth light beam L5 and the sixth light beam L6. The processing unit 160 is further configured to calculate a third displacement value of the third displacement measuring module 230 relative to a third position on the first measuring surface 10a of the measured object 10 according to the third interference pattern I3, and further calculate a rotation angle of the rotation angle measuring device 100b relative to the measured object 10 around Y axis according to the first and the third displacement values. Similarly, as shown in FIG. 7, the third beam splitter 250 splits the first light beam L1 and the second light beam L2 in order to generate a seventh light beam L7 with the first polarization direction and a eighth light beam L8 with the second polarization direction. The fourth beam splitter 260 splits the seventh light beam L7 and the eighth light beam L8 in order to generate a ninth light beam L9 with the first polarization direction and a tenth light beam L10 with the second polarization direction. The fourth displacement measuring module 270 and the fifth displacement measuring module 280 are configured to measure the second measuring surface 10b of the measured object 10. The seventh light beam L7 and the eighth light beam L8 are reflected to the image sensor 150 after passing through the fourth displacement measuring module 270. The ninth light beam L9 and the tenth light beam L10 are reflected to the image sensor 150 after passing through the fifth displacement measuring module 280. The image sensor 150 is further configured to sense a fourth interference pattern I4 generated by the seventh light beam L7 and the eighth light beam L8, and senses a fifth interference pattern I5 generated by the ninth light beam L9 and the tenth light beam L10. The processing unit 160 is further configured to calculate a fourth displacement value of the fourth displacement measuring module 270 relative to a fourth position on the second measuring surface 10b of the measured object 10 according to the fourth interference pattern I4, and further configured to calculate a fifth displacement value of the fifth displacement measuring module 280 relative to a fifth position on the second measuring surface 10b of the measured object 10 according to the fifth interference pattern I5. The processing unit 160 can further calculate a rotation angle of the measured object 10 around X axis according to the fourth and the fifth displacement values.

The second embodiment of the rotation angle measuring device 100b of the present invention can further comprises a fifth beam splitter 300 and a sixth displacement measuring module 290 configured to measure the third measuring surface 10c of the measured object 10. The processing unit 160 can calculate a sixth displacement value of the sixth displacement measuring module 290 relative to the third measuring surface 10c of the measured object 10 along Z axis.

According to the above arrangement, the processing unit 160 can calculate the displacement values of the rotation angle measuring device 100b relative to the measured object 10 along X, Y, Z axes according to the first to sixth interference patterns I1-I6 generated by the first to twelfth light beam L1-L12. The processing unit 160 can further calculate the rotation angle of the rotation angle measuring device 100b relative to the measured object 10 around X, Y, Z axes. In other words, the rotation angle measuring device 100b of the present invention can measure all the displacement values and rotation angles of the measured object 10 in a three dimensional space.

Figure 8:
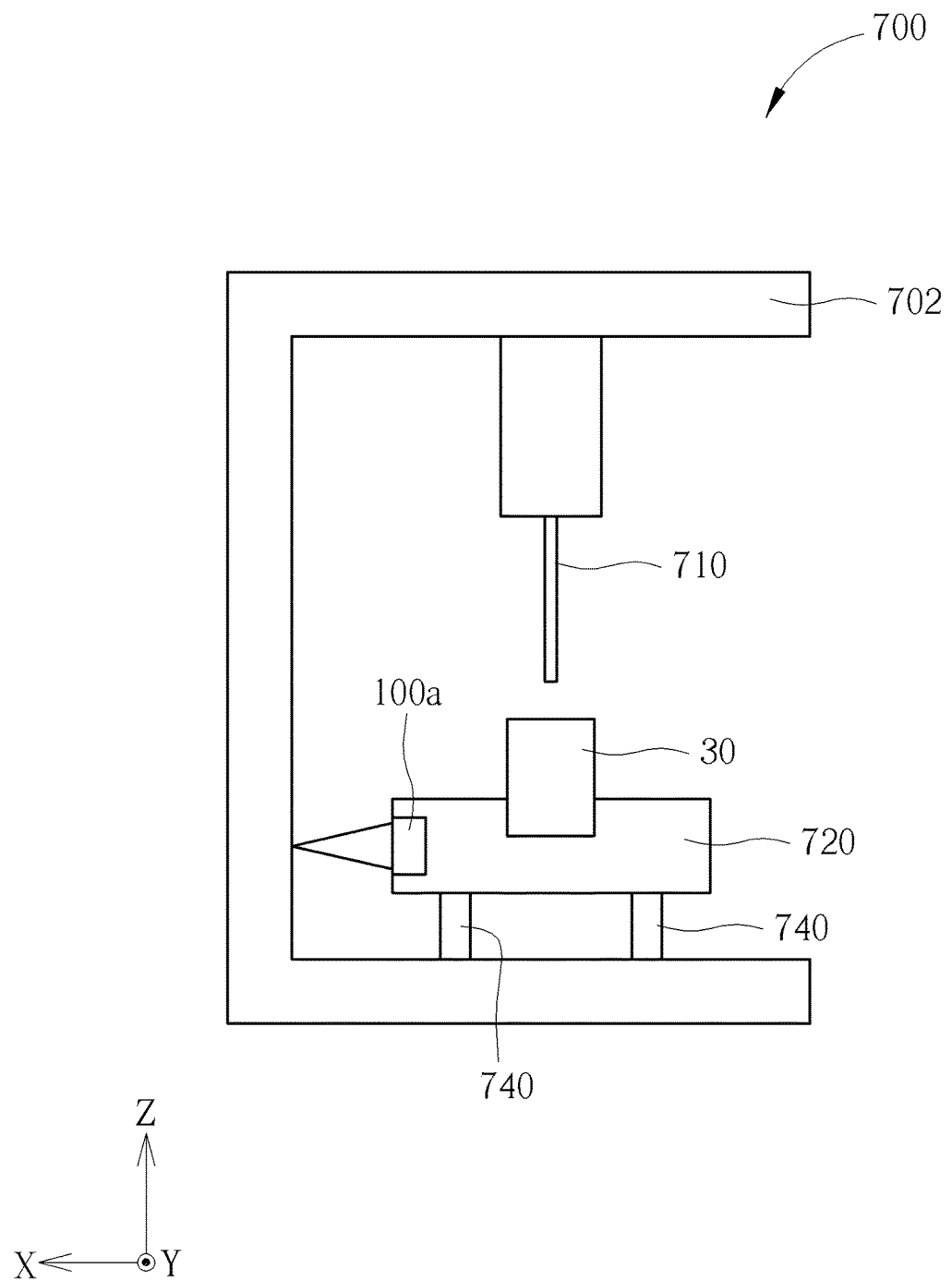
FIG. 8 is a diagram showing a first embodiment of a machining system of the present invention.

Since the rotation angle measuring device 100a, 100b of the present invention can have a simpler structure and a smaller size, the rotation angle measuring device 100a, 100b of the present invention can be easily integrated with a machining device. Please refer to FIG. 8. FIG. 8 is a diagram showing a first embodiment of a machining system of the present invention. As shown in FIG. 8, the machining system 700 of the present invention comprises a base 702, a cutting tool 710, a holding platform 720, a plurality of supporting frames 740 and a rotation angle measuring device 100a. The cutting tool 710 is arranged on the base 702 for machining a workpiece 30. The holding platform 720 is arranged on the supporting frame 740 for holding the workpiece 30, and is movable and/or rotatable relative to the base 702 through the supporting frames 740. The rotation angle measuring device 100a is arranged on the holding platform 720. The supporting frame 740 can be consisted of piezoelectric elements. The supporting frame 740 and the holding platform 720 are electrically connected to the processing unit 160 of the rotation angle measuring device 100a. When the workpiece 30 is machined by the cutting tool 710, the holding platform 720 can be moved or rotated according to a displacement value and a rotation angle of the holding platform 220 relative to the base 202 (such as the displacement value along X axis and the rotation angle around Z axis in FIG. 8) obtained by the processing unit 160. Therefore, resolution of movement of the holding platform 720 can be controlled at the sub-micron level or nano level, and the rotation angle of the holding platform 720 relative to the base 702 can be precisely controlled.

Figure 9:
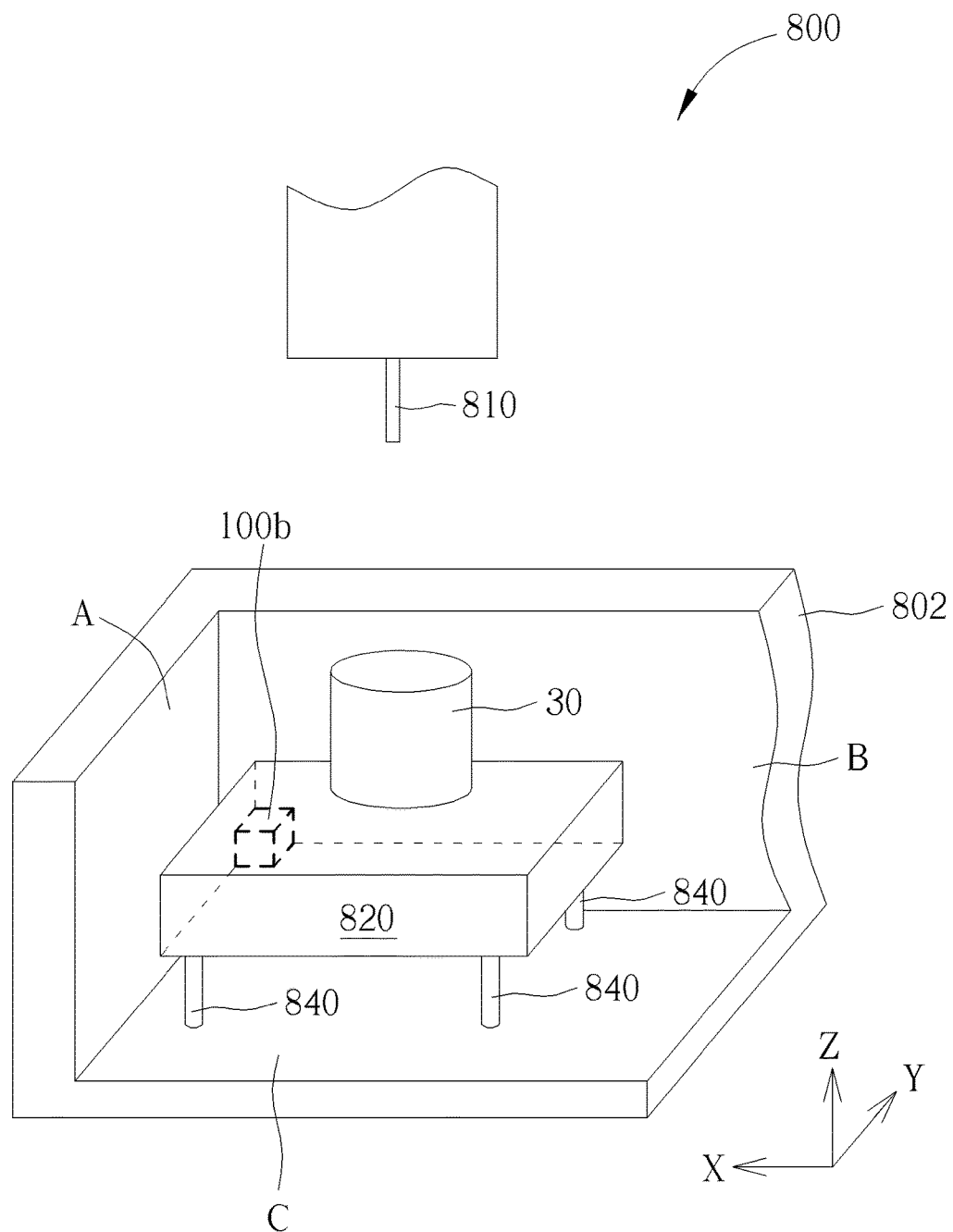
FIG. 9 is a diagram showing a second embodiment of the machining system of the present invention.

Please refer to FIG. 9. FIG. 9 is a diagram showing a second embodiment of the machining system of the present invention. As shown in FIG. 9, the machining system 800 comprises a base 802, a cutting tool 810, a holding platform 820, a plurality of supporting frames 840 and a rotation angle measuring device 100b. The machining system 800 of the present invention is similar to the machining system 700. The difference is that the rotation angle measuring device 100b is configured to measure displacement values and rotation angles of the holding platform 820 relative to three surfaces A, B, C of the base 802. According to the above measuring method, the rotation angle measuring device 100b of the present invention utilizes the first to sixth displacement measuring modules to measure the displacement values of the holding platform 820 relative to the base 802 along X, Y, Z axes and rotation angles of the holding platform 820 relative to the base 802 around X, Y, Z axes. In the present embodiment, the first displacement measuring module 110, the second displacement measuring module 120 and the third displacement measuring module 230 of the rotation angle measuring device 100b are configured to measure the surface A of the base 802. The fourth displacement measuring module 270 and the fifth displacement measuring module 280 are configured to measure the surface B of the base 802. The six displacement measuring module 290 is configured to measuring the surface C of the base 802. According to the above arrangement, when the workpiece 30 is machined by the cutting tool 810, the holding platform 820 can be moved or rotated according to the displacement values of the holding platform 820 along X, Y, Z axes and rotation angles of the holding platform 820 relative to the base 802 around X, Y, Z axes obtained by the processing unit 160. Therefore, resolution of movement of the holding platform 820 can be controlled at the sub-micron level or nano level, and the rotation angle of the holding platform 820 relative to the base 802 can be precisely controlled.

In addition, arrangements of the machining systems 700, 800 of the present invention in FIG. 8 and FIG. 9 are illustrated as examples, the present invention is not limited thereto. In the machining system 700, 800 of the present invention, relative positions between the cutting tool 710, 810, the holding platform 720, 820, the supporting frame 740, 840 and the rotation angle measuring device 100a, 100b can be changed according to design requirements.

In contrast to the prior art, the rotation angle measuring device of the present invention has a simpler structure and a smaller size. Therefore, the rotation angle measuring device of the present invention can be easily integrated with the machining device, in order to perform sub-micron level or nano level machining on the workpiece. Moreover, the displacement measuring device of the present invention has less beam energy loss. Therefore, the displacement measuring device of the present invention can achieve higher measurement precision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rotation angle measuring device, comprising:
    a light source configured to generate a first light beam with a first polarization direction and a second light beam with a second polarization direction;
    a first beam splitter configured to split the first and second light beams to generate a third light beam with the first polarization direction and a fourth light beam with the second polarization direction;
    a first displacement measuring module configured to allow the first and second light beams to pass through a first side of the first displacement measuring module and to be further reflected to pass through a second side of the first displacement measuring module, wherein the first light beam is reflected by a first measuring surface of a measured object, and the second light beam is reflected inside the first displacement measuring module;
    a second displacement measuring module configured to allow the third and fourth light beam to pass through a first side of the second displacement measuring module and to be further reflected to pass through a second side of the second displacement measuring module, wherein the third light beam is reflected by the first measuring surface of the measured object, and the fourth light beam is reflected inside the second displacement measuring module;
    an image sensor configured to sense a first interference pattern generated by the first and second light beams passing through the first displacement measurement module, and sense a second interference pattern generated by the third and fourth light beams passing through the second displacement measurement module; and
    a processing unit electrically connected to the image sensor for calculating a first displacement value of the first displacement measuring module relative to a first position on the first measuring surface of the measured object along a first axis according to the first interference pattern, and calculating a second displacement value of the second displacement measuring module relative to a second position on the first measuring surface of the measured object along the first axis according to the second interference pattern, in order to further calculate a rotation angle of the rotation angle measuring device relative to the measured object around a second axis according to the first and second displacement values.

2. The rotation angle measuring device of claim 1, wherein each of the first and second displacement measuring modules comprises an optical module and a beam splitting module, the optical module is configured to reflect or refract light to the beam splitting module, the beam splitting module comprises a transparent plate, a polarizing beam splitting layer and a reflective layer, the transparent plate has a first surface and a second surface, the first surface is arranged between the second surface and the first measuring surface of the measured object, the polarizing beam splitting layer is formed on the first surface for allowing light with the first polarization direction to pass through and reflecting light with the second polarization direction, the reflective layer is partially formed on the second surface for reflecting light.

3. The rotation angle measuring device of claim 1, further comprising:
    a first reflective element configured to reflect the first and second light beams passing through the second side of the first displacement measuring module to the image sensor; and
    a second reflective element configured to reflect the third and fourth light beams passing through the second side of the second displacement measuring module to the image sensor.

4. The rotation angle measuring device of claim 1, wherein the image sensor comprises a linear polarizing plate and an image sensing unit, the linear polarizing plate is configured to receive the first and second light beams to generate the first interference pattern, and to receive the third and fourth light beams to generate the second interference pattern, the image sensing unit is configured to sense the first interference pattern and the second interference pattern on the linear polarizing plate.

5. The rotation angle measuring device of claim 1, further comprising:
    a second beam splitter configured to split the first and second light beams to generate a fifth light beam with the first polarization direction and a sixth light beam with the second polarization direction;
    a third beam splitter configured to split the first and second light beams to generate a seventh light beam with the first polarization direction and an eighth light beam with the second polarization direction;

a fourth beam splitter configured to split the seventh and eighth light beams to generate a ninth light beam with the first polarization direction and a tenth light beam with the second polarization direction;

a third displacement measuring module configured to allow the fifth and sixth light beams to pass through a first side of the third displacement measuring module and to be further reflected to pass through a second side of the third displacement measuring module, wherein the fifth light beam is reflected by the first measuring surface of the measured object, and the sixth light beam is reflected inside the third displacement measuring module;

a fourth displacement measuring module configured to allow the seventh and eighth light beams to pass through a first side of the fourth displacement measuring module and to be further reflected to pass through a second side of the fourth displacement measuring module, wherein the seventh light beam is reflected by a second measuring surface of the measured object, and the eighth light beam is reflected inside the fourth displacement measuring module;

a fifth displacement measuring module configured to allow the ninth and tenth light beams to pass through a first side of the fifth displacement measuring module and to be further reflected to pass through a second side of the fifth displacement measuring module, wherein the ninth light beam is reflected by the second measuring surface of the measured object, and the tenth light beam is reflected inside the fifth displacement measuring module;

wherein the image sensor is further configured to sense a third interference pattern generated by the fifth and sixth light beams passing through the second side of the third displacement measuring module, and to sense a fourth interference pattern generated by the seventh and eighth light beams passing through the second side of the fourth displacement measuring module, and to sense a fifth interference pattern generated by the ninth and tenth light beams passing through the second side of the fifth displacement measuring module;

wherein the processing unit is further configured to calculate a third displacement value of the third displacement measuring module relative to a third position on the first measuring surface of the measured object along the first axis according to the third interference pattern, and further calculate a rotation angle of the rotation angle measuring device relative to the measured object around a third axis according to the second and third displacement values, the processing unit is further configured to calculate a fourth displacement value of the fourth displacement measuring module relative to a fourth position on the second measuring surface of the measured object along the third axis according to the fourth interference pattern, and to calculate a fifth displacement value of the fifth displacement measuring module relative to a fifth position on the second measuring surface of the measured object along the third axis according to the fifth interference pattern, and further calculate a rotation angle of the rotation angle measuring device relative to the measured object around the first axis according to the fourth and fifth displacement values.

6. The rotation angle measuring device of claim 5, wherein the first axis, the second axis and the third axis are perpendicular to each other.

7. The rotation angle measuring device of claim 5, further comprising:

a fifth beam splitter configured to split the first and second light beams to generate an eleventh light beam with the first polarization direction and a twelfth light beam with the second polarization direction; and a sixth displacement measuring module configured to allow the eleventh and twelfth light beams to pass through a first side of the sixth displacement measuring module and to be further reflected to pass through a second side of the sixth displacement measuring module, wherein the eleventh light beam is reflected by a third measuring surface of the measured object, and the twelfth light beam is reflected inside the sixth displacement measuring module;

wherein the image sensor is further configured to sense a sixth interference pattern generated by the eleventh and twelfth light beams passing through the second side of the sixth displacement measuring module;

wherein the processing unit is further configured to calculate a sixth displacement value of the sixth displacement measuring module relative to the third measuring surface of the measured object along the second axis according to the sixth interference pattern.

8. A machining system, comprising:

a base;

a cutting tool arranged on the base for machining a workpiece;

at least one supporting frame arranged on the base;

a holding platform arranged on the at least one supporting frame for holding the workpiece, the holding platform being movable or rotatable relative to the base through the at least one supporting frame; and a rotation angle measuring device arranged on the holding platform, the rotation angle measuring device comprising:

a light source configured to generate a first light beam with a first polarization direction and a second light beam with a second polarization direction;

a first beam splitter configured to split the first and second light beams to generate a third light beam with the first polarization direction and a fourth light beam with the second polarization direction;

a first displacement measuring module configured to allow the first and second light beams to pass through a first side of the first displacement measuring module and to be further reflected to pass through a second side of the first displacement measuring module, wherein the first light beam is reflected by a first measuring surface of the base, and the second light beam is reflected inside the first displacement measuring module;

a second displacement measuring module configured to allow the third and fourth light beam to pass through a first side of the second displacement measuring module and to be further reflected to pass through a second side of the second displacement measuring module, wherein the third light beam is reflected by the first measuring surface of the base, and the fourth light beam is reflected inside the second displacement measuring module;

an image sensor configured to sense a first interference pattern generated by the first and second light beams passing through the first displacement measurement module, and sensing a second interference pattern generated by the third and fourth light beams passing through the second displacement measurement module; and a processing unit electrically connected to the image sensor for calculating a first displacement value of the first displacement measuring module relative to a first position on the first measuring surface of the base along a first axis according to the first interference pattern, and calculating a second displacement value of the second displacement measuring module relative to a second position on the first measuring surface of the base along the first axis according to the second interference pattern, in order to further calculate a rotation angle of the rotation angle measuring device relative to the base around a second axis according to the first and second displacement values.

9. The machining system of claim 8, wherein each of the first and second displacement measuring modules comprises an optical module and a beam splitting module, the optical module is configured to reflect or refract light to the beam splitting module, the beam splitting module comprises a transparent plate, a polarizing beam splitting layer and a reflective layer, the transparent plate has a first surface and a second surface, the first surface is arranged between the second surface and the first measuring surface of the base, the polarizing beam splitting layer is formed on the first surface for allowing light with the first polarization direction to pass through and reflecting light with the second polarization direction, the reflective layer is partially formed on the second surface for reflecting light.

10. The machining system of claim 8, wherein the rotation angle measuring device further comprises:
a first reflective element configured to reflect the first and second light beams passing through the second side of the first displacement measuring module to the image sensor; and
a second reflective element configured to reflect the third and fourth light beams passing through the second side of the second displacement measuring module to the image sensor.

11. The machining system of claim 8, wherein the image sensor comprises a linear polarizing plate and an image sensing unit, the linear polarizing plate is configured to receive the first and second light beams to generate the first interference pattern, and to receive the third and fourth light beams to generate the second interference pattern, the image sensing unit is configured to sense the first interference pattern and the second interference pattern on the linear polarizing plate.

12. The machining system of claim 8, wherein the holding platform is further configured to be moved and/or rotated relative to the base according to the first displacement value, the second displacement value and/or the rotation angle.

13. The machining system of claim 8, wherein the rotation angle measuring device further comprises:
a second beam splitter configured to split the first and second light beams to generate a fifth light beam with the first polarization direction and a sixth light beam with the second polarization direction;
a third beam splitter configured to split the first and second light beams to generate a seventh light beam with the first polarization direction and an eighth light beam with the second polarization direction;
a fourth beam splitter configured to split the seventh and eighth light beams to generate a ninth light beam with the first polarization direction and a tenth light beam with the second polarization direction;
a third displacement measuring module configured to allow the fifth and sixth light beams to pass through a first side of the third displacement measuring module and to be further reflected to pass through a second side of the third displacement measuring module, wherein the fifth light beam is reflected by the first measuring surface of the base and the sixth light beam is reflected inside the third displacement measuring module;
a fourth displacement measuring module configured to allow the seventh and eighth light beams to pass through a first side of the fourth displacement measuring module and to be further reflected to pass through a second side of the fourth displacement measuring module, wherein the seventh light beam is reflected by a second measuring surface of the base and the eighth light beam is reflected inside the fourth displacement measuring module;
a fifth displacement measuring module is configured to allow the ninth and tenth light beams to pass through a first side of the fifth displacement measuring module and to be further reflected to pass through a second side of the fifth displacement measuring module, wherein the ninth light beam is reflected by the second measuring surface of the base and the tenth light beam is reflected inside the fifth displacement measuring module;
wherein the image sensor is further configured to sense a third interference pattern generated by the fifth and sixth light beams passing through the second side of the third displacement measuring module, and to sense a fourth interference pattern generated by the seventh and eighth light beams passing through the second side of the fourth displacement measuring module, and to sense a fifth interference pattern generated by the ninth and tenth light beams passing through the second side of the fifth displacement measuring module;
wherein the processing unit is further configured to calculate a third displacement value of the third displacement measuring module relative to a third position on the first measuring surface of the base along the first axis according to the third interference pattern, and further calculate a rotation angle of the rotation angle measuring device relative to the base around a third axis according to the second and third displacement value, the processing unit is further configured to calculate a fourth displacement value of the fourth displacement measuring module relative to a fourth position on the second measuring surface of the base along the third axis according to the fourth interference pattern, and to calculate a fifth displacement value of the fifth displacement measuring module relative to a fifth position of the second measuring surface of the base along the third axis according to the fifth interference pattern, and further calculate a rotation angle of the rotation angle measuring device relative to the base around the first axis according to the fourth and fifth displacement value.

14. The machining system of claim 13, wherein the first axis, the second axis and the third axis are perpendicular to each other.

15. The machining system of claim 13, further comprising:
a fifth beam splitter configured to split the first and second light beams to generate an eleventh light beam with the first polarization direction and a twelfth light beam with the second polarization direction; and a sixth displacement measuring module configured to allow the eleventh and twelfth light beams to pass through a first side of the sixth displacement measuring module and to be further reflected to pass through a second side of the sixth displacement measuring module, wherein the eleventh light beam is reflected by a third measuring surface of the base, and the twelfth light beam is reflected inside the sixth displacement measuring module;

wherein the image sensor is further configured to sense a sixth interference pattern generated by the eleventh and twelfth light beams passing through the second side of the sixth displacement measuring module;

wherein the processing unit is further configured to calculate a sixth displacement value of the sixth displacement measuring module relative to the third measuring surface of the base along the second axis according to the sixth interference pattern.

* * * * *